US012749277B2

(12) United States Patent
Wang et al.

(10) Patent No.: US 12,749,277 B2
(45) Date of Patent: Sep. 29, 2026

(54) LABEL LAYOUT METHOD BASED ON USER PERCEPTION FOR RAPID POSITIONING IN VIRTUAL SCENES

(71) Applicant: Beihang University, Beijing (CN)

(72) Inventors: Lili Wang, Beijing (CN); Shuai Luan, Beijing (CN); Jian Wu, Beijing (CN); Qinping Zhao, Beijing (CN)

(73) Assignee: Beihang University, Beijing (CN)

( * ) Notice: Subject to any disclaimer, the term of this patent is extended or adjusted under 35 U.S.C. 154(b) by 34 days.

(21) Appl. No.: 18/944,776

(22) Filed: Nov. 12, 2024

(65) Prior Publication Data

US 2026/0024294 A1 Jan. 22, 2026

(30) Foreign Application Priority Data

Jul. 22, 2024 (CN) ........................ 202410980649.8

(51) Int. Cl.

| | |
|---|---|
| ***G06T 19/20*** | (2011.01) |
| ***G06F 3/01*** | (2006.01) |
| ***G06V 10/74*** | (2022.01) |
| ***G06V 10/764*** | (2022.01) |
| ***G06V 20/70*** | (2022.01) |

(52) U.S. Cl.

CPC .............. *G06T 19/20* (2013.01); *G06F 3/013* (2013.01); *G06V 10/761* (2022.01); *G06V 10/764* (2022.01); *G06V 20/70* (2022.01); *G06T 2219/2004* (2013.01)

(58) Field of Classification Search

CPC . G06T 19/20; G06T 2219/2004; G06V 20/70; G06V 10/761; G06V 10/764; G03F 3/013

USPC .......................................................... 345/419

See application file for complete search history.

(56) References Cited

U.S. PATENT DOCUMENTS

| | | | | |
|---|---|---|---|---|
| 2019/0188895 | A1* | 6/2019 | Miller, IV | G06F 3/011 |
| 2021/0056306 | A1* | 2/2021 | Hu | G06N 3/084 |
| 2023/0368458 | A1* | 11/2023 | Dryer | G06F 3/04815 |

* cited by examiner

*Primary Examiner* — Jin Ge

(57) ABSTRACT

The embodiments of this disclosure disclose a label layout method based on user perception for rapid positioning in virtual scenes. One mode of specific implementation of this method comprises: determining a user interest corresponding to each scene object, selecting a target perception object from various scene objects to obtain a target perception object set; for each target perception object, performing the following steps: based on a perception time mapping function and the user interest, determining a user perception force; based on viewport coordinates, determining a camera force; determining a sum of the user perception force and the camera force as a user perceived attraction force; based on a dynamic adjustment force and the user perceived attraction force, generating a label acting force; based on various label acting forces, updating positions of various target guide labels.

15 Claims, 3 Drawing Sheets

LABEL LAYOUT METHOD BASED ON USER PERCEPTION FOR RAPID POSITIONING IN VIRTUAL SCENES

CROSS-REFERENCE TO RELATED APPLICATION

The present application is based on, and claims priority from Chinese application number 2024109806498, filed on Jul. 22, 2024, the disclosure of which is hereby incorporated by reference herein in its entirety.

TECHNICAL FIELD

The embodiments of this disclosure relate to the field of computer graphics and virtual reality, and specifically to a label layout method based on user perception for rapid positioning in virtual scenes.

BACKGROUND

In virtual reality scenes, guide labels through layout can accelerate the process of users quickly finding target objects from a large number of scene objects, which has a significant influence on improving the execution efficiency of target search tasks. At present, a commonly used method for label layout is to cluster similar objects, simplify and deduplicate various guide labels in crowded scenes based on the representative objects of each cluster, and place the deduplicated guide labels in the objects' local 3D spatial positions.

However, in practice, it has been found that when using the above method for label layout, the following technical problems often arise:

Firstly, when the layout of various objects in the scene is relatively compact, placing guide labels in the objects' local 3D spatial positions may easily cause occlusion between the guide labels, thereby making it difficult for a user to visually perceive the various guide labels;

Secondly, when the clustering effect is poor, objects of different categories are easily misclassified into one category, and it is also difficult for the selected objects to represent the entire cluster, with the user interest not taken into consideration, thus leading to difficulty in filtering out in a timely manner the various guide labels that the user is interested in.

The information disclosed above is only for enhancing the understanding of the background of the conception of this disclosure, so it may contain information that does not constitute the existing art known to a person having ordinary skill in the art in this country.

SUMMARY

The content of this disclosure is to briefly introduce conceptions, which will be described in detail in the section of detailed description of the invention later. The content of this disclosure is not intended to identify key or necessary features of the claimed technical solution, nor is it intended to limit the scope of the claimed technical solution.

Some embodiments of this disclosure propose a label layout method based on user perception for rapid positioning in virtual scenes, to solve one or more of the technical problems mentioned in the background section above.

Some embodiments of this disclosure provide a label layout method based on user perception for rapid positioning in virtual scenes, which comprises: determining a user interest corresponding to each scene object in a virtual scene during a target time period, wherein each scene object corresponds to a guide label, and the attribute information corresponding to the guide label includes viewport coordinates, label visibility, and environmental contrast; selecting a scene object that meets a preset interest condition from the various scene objects included in the virtual scene as a target perception object, to obtain a target perception object set; for each target perception object in the target perception object set, performing the following steps: based on a pre-constructed perception time mapping function and a user interest corresponding to the target perception object, determining a user perception force corresponding to a target guide label, wherein the target guide label is a guide label corresponding to the target perception object, the perception time mapping function characterizes a mapping relationship between the guide label and the user perception time, and the user perception force is a force for moving the guide label to the 3D spatial position with the minimum user perception time; based on the viewport coordinates corresponding to the target guide label, determining a camera force corresponding to the target guide label, wherein the camera force is a force for keeping the guide label within the user's field of view; determining the sum of the user perception force and the camera force as a user perceived attraction force corresponding to the target guide label; based on a dynamic adjustment force corresponding to the target guide label and the user perceived attraction force, generating a label acting force, wherein the dynamic adjustment force is a pre-generated force that determines the positional relationship between various guide labels in the virtual scene and between the guide label and the target perception object based on a dynamic potential field; based on the various determined label acting forces, updating the positions of various target guide labels corresponding to the target perception object set to obtain a label position update information set for layout of the various target guide labels.

The embodiments of this disclosure have the following beneficial effects: The label layout method based on user perception for rapid positioning in virtual scenes of some embodiments of this disclosure enables a user to perceive various guide labels in a timely manner. Specifically, the reason why the various guide labels are not easily perceived by a user is that: when the layout of various objects in the scene is relatively compact, placing guide labels in the objects' local 3D spatial positions may easily cause occlusion between the guide labels, thereby making it difficult for the user to visually perceive the various guide labels. Based on this, the label layout method based on user perception for rapid positioning in virtual scenes of some embodiments of this disclosure is, firstly, determining a user interest corresponding to each scene object in a virtual scene during a target time period, wherein each scene object corresponds to a guide label, and attribute information corresponding to the guide label includes viewport coordinates, label visibility, and environmental contrast. From this, the level of interest of the user in various objects in the virtual scene may be determined. Secondly, a scene object that meets a preset interest condition, is selected from the various scene objects included in the virtual scene, as a target perception object, to obtain a target perception object set. This facilitates the subsequent layout of guide labels for various objects that the user is most interested in. Then, for each target perception object in the target perception object set, the following steps are performed: based on a pre-constructed perception time mapping function and a user interest corresponding to the target perception object, determining a user perception force corresponding to a target guide label, wherein the target guide label is a guide label corresponding to the target perception object, the perception time mapping function characterizes a mapping relationship between the guide label and the user perception time, and the user perception force is a force for moving the guide label to the 3D spatial position with the minimum user perception time; based on the viewport coordinates corresponding to the target guide label, determining a camera force corresponding to the target guide label, wherein the camera force is a force for keeping the guide label within the user's field of view; determining the sum of the user perception force and the camera force as a user perceived attraction force corresponding to the target guide label; based on a dynamic adjustment force corresponding to the target guide label and the user perceived attraction force, generating a label acting force, wherein the dynamic adjustment force is a pre-generated force that determines the positional relationship between various guide labels in the virtual scene and between the guide label and the target perception object based on a dynamic potential field. Therefore, for each target perception object that the user is most interested in, the user perceived attraction force may be determined based on the user interest, perception time, and viewport constraints, and combined with dynamic adjustment force, the label acting force for label layout may be obtained finally. In the end, based on the various determined label acting forces, the positions of various target guide labels corresponding to the target perception object set are updated to obtain a label position update information set for layout of the various target guide labels. Therefore, based on the label acting force, various guide labels that the user is interested in may be laid out in the 3D spatial position with the minimum user perception time. Therefore, the label layout method based on user perception for rapid positioning in virtual scenes of some embodiments of this disclosure determines the user perceived attraction force based on the user interest of the interested scene object and the user perception time of the guide label, which can facilitate the layout of the guide label in a 3D spatial position that is more easily perceived by the user. Thus, a user can timely perceive various interested guide labels and corresponding scene objects. Moreover, because the guide labels of virtual objects that the user is more interested in may be laid out in positions where the user perception time is shorter, the execution time of target search tasks may be shortened, thereby improving the positioning efficiency of the user in real-time, reducing the user workload, elevating usability, and having lower incidence of motion sickness.

BRIEF DESCRIPTION OF THE DRAWINGS

The above and other features, advantages, and aspects of the embodiments of this disclosure will become more apparent in conjunction with the accompanying drawings and with reference to the following specific implementations. Throughout the drawings, the same or similar reference signs indicate the same or similar elements. It should be understood that the drawings are schematic, and the components and elements are not necessarily drawn to scale.

DETAILED DESCRIPTION OF THE INVENTION

Figure 1:
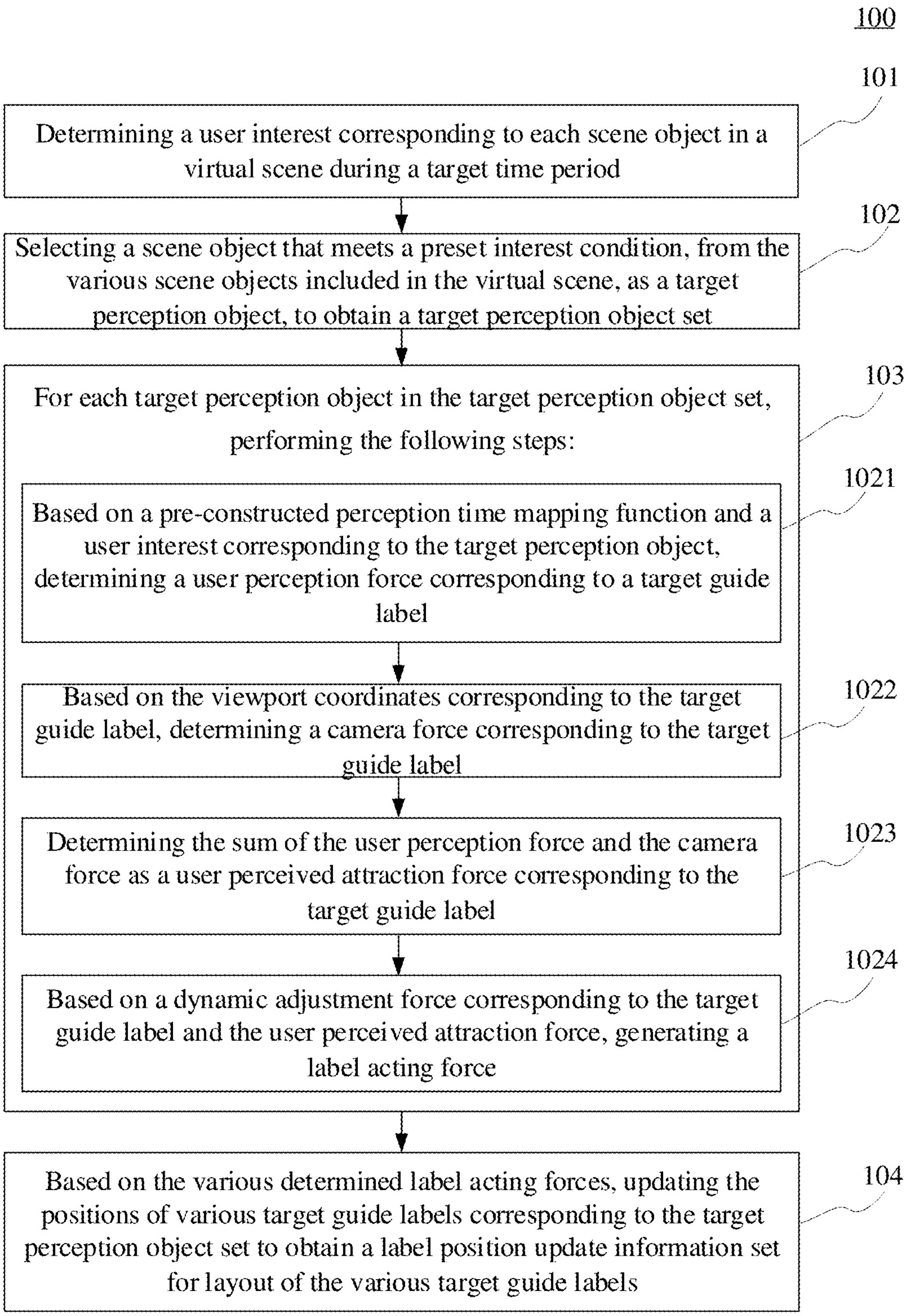
FIG. 1 is a flowchart of some embodiments of a label layout method based on user perception for rapid positioning in virtual scenes according to this disclosure.

Hereinafter, the embodiments of this disclosure will be described in more detail with reference to the accompanying drawings. Although certain embodiments of this disclosure are shown in the drawings, it should be understood that this disclosure may be implemented in various forms, and shall not be construed as being limited to the embodiments set forth herein. On the contrary, these embodiments are provided for a more thorough and complete understanding of this disclosure. It should be understood that the drawings and embodiments of this disclosure are used only for illustrative purposes, not to limit the protection scope of this disclosure.

Besides, it should be noted that, for ease of description, only the portions related to the relevant invention are shown in the drawings. In the case of no conflict, the embodiments in this disclosure and the features in the embodiments may be combined with each other.

It should be noted that such concepts as "first" and "second" mentioned in this disclosure are only used to distinguish different devices, modules or units, and are not used to limit the order of functions performed by these devices, modules or units or interdependence thereof.

It should be noted that such adjuncts as "one" and "more" mentioned in this disclosure are illustrative, not restrictive, and those skilled in the art should understand that, unless the context clearly indicates otherwise, they should be understood as "one or more".

The names of messages or information exchanged between multiple devices in the embodiments of this disclosure are only for illustrative purposes, and are not intended to limit the scope of these messages or information.

This disclosure will be described in detail below with reference to the accompanying drawings and in conjunction with embodiments.

FIG. 1 is a flow 100 of some embodiments of a label layout method based on user perception for rapid positioning in virtual scenes according to this disclosure. The label layout method based on user perception for rapid positioning in virtual scenes comprises the following steps:

Step 101: Determining a user interest corresponding to each scene object in a virtual scene during a target time period.

In some embodiments, the executing body (such as a head mounted display device) of the label layout method based on user perception for rapid positioning in virtual scenes can, through various means, determine a user interest corresponding to each scene object in a virtual scene during a target time period. Wherein, each scene object may correspond to a guide label. The scene object may be an object in a virtual scene, and may be associated with a scene object identifier. The scene object identifier may be a unique identifier of the scene object. The guide label may be a graph with scene object identifiers. The attribute information corresponding to the guide label includes viewport coordinates, label visibility, and environmental contrast. The viewport coordinates may be the corresponding 3D coordinates of the position of the guide label in the viewport coordinate system. The label visibility may be the ratio of the number of accessible sampling points corresponding to the guide label to the total number of sampling points. The sampling point may be obtained by sampling the label contour. For example, when the label contour is a rectangle, sample the four edges of the rectangle. When projecting a ray from the camera angle towards a sampling point, if the ray does not collide with any obstacles during its travel, the above sampling point is an accessible sampling point. The environmental contrast can characterize the degree of color difference between the guide label and the background environment. The target time period may be a time period of a preset duration earlier than and adjacent to the current time. The preset duration may be a duration set in advance. For example, the preset duration may be 1 second. The user interest may characterize the degree of interest of the user in a scene object. It should be noted that during the target time period mentioned above, the executing body may obtain continuous frame views of the virtual scene, and each frame view may be a scene image when the user gazes at a scene object in the virtual scene.

In certain optional implementations of some embodiments, the executing body may determine, by the following steps, the user interest corresponding to each scene object in the virtual scene during the target time period:

The first step is to classify various scene objects in the virtual scene, to obtain a target gaze crossing object set and a non-target gaze crossing object set. Wherein, each target gaze crossing object may be an object that is being gazed at by the user during the target time period. Each target gaze crossing object may correspond to the user gaze duration. The user gaze duration may be the duration of the user's gaze at the target gaze crossing object. For each scene object in the virtual scene, perform the following steps:

The first sub-step is to determine the scene object as a target gaze crossing object in response to determining that the scene object meets a preset gaze condition. Wherein, the preset gaze condition may be that the scene object is the nearest object intersecting with the user gaze center. The user gaze center may be the midpoint of the screen after the user wears a head mounted display device. The nearest object may be the first object in the virtual scene that intersects with the user gaze center.

The second sub-step is, in response to determining that the scene object does not meet the preset gaze condition, to identify the scene object as a non-target gaze crossing object.

In practice, during the above target time period, when the user's viewpoint changes, the target gaze crossing object is also dynamically updated as the user gaze center changes. Therefore, there are multiple target gaze crossing objects during the target time period.

The second step is, for each target gaze crossing object in the target gaze crossing object set, to determine the ratio of the user gaze duration corresponding to the target gaze crossing object to the preset duration as a current interest of the target gaze crossing object. Wherein, the current interest characterizes the user's level of interest in the objects in the virtual scene at the current moment.

The third step is, for each non-target gaze crossing object in the non-target gaze crossing object set, to perform the following steps:

The first sub-step is to perform similarity analysis on the non-target gaze crossing object and each target gaze crossing object in the target gaze crossing object set, and obtain an object similarity information set. Wherein, the object similarity information in the object similarity information set can characterize the degree of similarity between the non-target gaze crossing object and the scene object the user is interested in. Various methods may be employed to perform similarity analysis on the non-target gaze crossing object and each target gaze crossing object in the target gaze crossing object set, to obtain an object similarity information set.

In certain optional implementations of some embodiments, the executing body may, through the following steps, perform similarity analysis on the non-target gaze crossing object and each target gaze crossing object in the target gaze crossing object set, to obtain an object similarity information set:

For each target gaze crossing object in the target gaze crossing object set, perform the following steps:

Step 1: Determine a contour similarity and an environment similarity between the target gaze crossing object and the non-target gaze crossing object. Wherein, the contour similarity may characterize the degree of similarity in contour between the target gaze crossing object and the non-target gaze crossing object. The environment similarity may characterize the degree of similarity in background environment between the target gaze crossing object and the non-target gaze crossing object. The contour similarity and environment similarity between scene objects may be determined through the following steps:

Sub-step 1: Determine the contour similarity. First, image capture. For each scene object in the target gaze crossing object and the non-target gaze crossing object, virtual cameras may be placed at predetermined distances directly above, in front of, and to the left of the scene objects to capture three images of the scene object. The predetermined distances may be distances set to ensure that the scene object is fully displayed in the image. Second, each captured image is preprocessed to obtain a target binary image. Wherein, the preprocessing includes: converting the image into a grayscale image, applying Gaussian blur to the grayscale image to reduce noise and smooth the image, performing adaptive thresholding to the smoothed grayscale image to convert it into a binary image, and performing morphological operations on the binary image to enhance structural continuity. The target binary image may be a binary image undergone morphological operations. Then, a Suzuki 85 boundary tracking algorithm is used to extract the scene object contour from each target binary image. Finally, based on the different shooting viewpoints, various scene object contours corresponding to each target binary image are grouped to obtain a group of scene object contour matching pairs, and the similarity measurement processing is performed on each scene object contour matching pair to obtain a contour similarity. Wherein, each scene object contour matching pair may include various scene object contours corresponding to the same shooting viewpoint. The similarity measurement processing may include Hu moment calculation, Hu moment normalization, and taking the mean of the normalized results. To be specific, for each scene object contour matching pair, the Hu moment similarity is determined and normalized to scale the Hu moment similarity to the (0,1) interval. Wherein, the normalization processing may be to determine the reciprocal of the sum of the preset value and the Hu moment similarity as the Hu moment similarity. The preset value may be a value set in advance that is not less than 1. For example, the preset value may be 1. Next, the average of the various normalized results obtained may be determined as the contour similarity.

Sub-step 2: Determine the environment similarity. First, for each scene object in the target gaze crossing object and the non-target gaze crossing object, obtain six images in six directions around the scene object, and determine a feature point information set corresponding to each image through an ORIENTED BRIEF (ORB) algorithm. Wherein, each feature point information may include a feature point identifier and a feature descriptor. The feature point identifier may be a unique identifier of a feature point. The feature descriptor may characterize the local feature corresponding to a feature point. The scene object may be removed from the virtual scene and a virtual camera may be placed at the center of the removed scene object to capture images of the scene object in six directions. Then, for each image shooting direction, a brutal matching method based on Hamming distance is used to perform feature point matching processing to a target shooting image matching pair corresponding to the image shooting direction, to obtain a group of matching point pairs. Wherein, the target shooting image matching pair may be images corresponding to different scene objects with the same shooting direction. It should be noted that, during the process of pairing feature points, cross checking is also performed to retain only the matching point pairs that pass the ratio test, thereby filtering out matching point pairs with relatively large distances. Afterwards, for the target shooting image matching pair corresponding to each image shooting direction, determine the average distance and maximum distance of the target shooting image matching pair based on the group of matching point pairs corresponding to the image shooting direction, and determine the image similarity between the target shooting image matching pairs based on a preset similarity formula. Finally, select the maximum value from the various image similarities corresponding to the various obtained image shooting directions as the environment similarity. Wherein, the preset similarity formula may be:

$$\phi_{image} = 1 - d_{avg} / d_{max}.$$

Wherein, $d_{avg}$ represents the average distance, $d_{max}$ represents the maximum distance, and $\phi_{image}$ represents the image similarity.

Step 2: Generate object similarity information based on the contour similarity and the environment similarity. Wherein, the object similarity information may include a scene object identifier corresponding to the target gaze crossing object, a scene object identifier corresponding to the non-target gaze crossing object and an object similarity. The object similarity may be generated using the following formula:

$$\Phi(o_1, o_2) = \frac{\phi_c(o_1, o_2)^2 + \sqrt{\phi_e(o_1, o_2)}}{2}.$$

Wherein, $o_1$ represents the non-target gaze crossing object, $o_2$ represents the target gaze crossing object, $\Phi(o_1, o_2)$ represents the object similarity information, $\phi_c(o_1, o_2)$ represents the contour similarity, and $\phi_e(o_1, o_2)$ represents the environment similarity.

Figure 2:
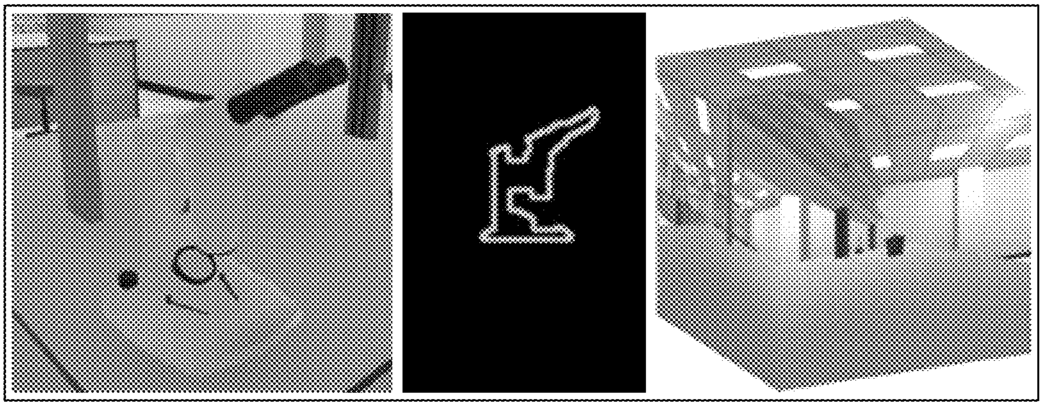
FIG. 2 is a schematic diagram of the contour and environment image corresponding to an example scene object obtained by the label layout method based on user perception for rapid positioning in virtual scenes according to this disclosure.

As an example, FIG. 2 is a schematic diagram of the contour and environment image corresponding to an example scene object obtained by the label layout method based on user perception for rapid positioning in virtual scenes according to this disclosure. Wherein, FIG. 2 includes a left subgraph, a right subgraph, and a middle subgraph. The microscope in the left subgraph is an example scene object. The middle subgraph is a contour map of the example scene object in the left direction. The right subgraph is an environment image corresponding to the example scene object. This makes it convenient to determine the similarity between various scene objects based on their corresponding contours and environment images.

The second sub-step is to determine a current interest corresponding to the non-target gaze crossing object based on the various current interests corresponding to the target gaze crossing object set and the object similarity information set. Wherein, the current interest corresponding to the non-target gaze crossing object may be determined by the following formula:

$$OIS(o_o, t) = \frac{\Phi(o_o, o_c) \times OIS(o_c, t) + \sum_{i=1}^{n-1} \Phi(o_o, o_{c_i}) \times \frac{T(o_{c_i}, t)}{N}}{n}.$$

Wherein, $o_o$ represents the non-target gaze crossing object, $o_c$ represents the target gaze crossing object last observed by the user during the target time period, t represents the target time period, i represents the serial number, $o_{c_i}$ represents the $i^{th}$ target gaze crossing object observed by the user during the target time period, N represents the duration corresponding to the target time period, n represents the number of target gaze crossing objects observed by the user during the target time period, OIS(•) represents the current interest, $OIS(o_o, t)$ represents the current interest corresponding to the non-target gaze crossing object $o_o$ during time period t, $OIS(o_o, t)$ represents the current interest corresponding to the target gaze crossing object $o_c$ during time period t, Φ(•) represents the object similarity between two scene objects, T(•) represents the duration of user observation of the scene object, and $T(o_{c_i}, t)$ represents the duration of the user observation of the target gaze crossing object $o_{c_i}$ during the time period t.

The fourth step is, based on an object historical interest information set, to update the current interest of each scene object in the virtual scene to generate a user interest. Wherein, each object historical interest information in the object historical interest information set may correspond one-to-one with the scene objects in the virtual scene. Each object historical interest information may be information on the user interest of the corresponding scene object in the virtual scene during the previous time period. The previous time period may be a time interval adjacent to and earlier than the target time period mentioned above. The previous time period may have the same duration as the target time period mentioned above. For each scene object in the virtual scene, the current interest of the scene object may be updated using the following formula to generate a user interest:

$$OIS(o, t) = \beta(t) * OIS(o, t-1) + (1 - \beta(t)) * OIS(o, t).$$

Wherein, the OIS(o, t) on the left side of the formula represents the user interest corresponding to the scene object o during the time period t, while the OIS(o, t) on the right side represents the current interest that has not been updated corresponding to the scene object o during the time period t, t−1 represents the previous time period, OIS(o, t−1) represents the user interest corresponding to the scene object o during the time period t−1, β(t) represents the attenuation factor, which determines the level of interest over time. The attenuation factor β(t) may be dynamically adjusted according to the user's behavior pattern, reflecting the attenuation or enhancement of interest over time. If a user continuously gazes at the same object for a period of time, causing it to intersect with the user gaze center and be closest, β(t) will decrease to maintain interest. On the contrary, if the user frequently changes focus during the time period t, reducing the reliability of interest, β(t) will increase to enhance interest of the previous period. Besides, in order to prevent a rapid decrease of OIS(o, t) when the user gaze is blank, this disclosure sets β(t) to slowly attenuate over time. The attenuation factor β(t) may be expressed according to the following formula:

$$\beta(t) = \begin{cases} e^{-\lambda \times N} & G_t = \emptyset \\ \beta_0 + (1 - \beta_0) \times \dfrac{SD(t)}{SD(t) + 1} & G_t \neq \emptyset \end{cases}.$$

Wherein, $e^{-\lambda \times N}$ represents a natural exponential function, λ represents an attenuation constant, $\beta_0$ represents a basic attenuation factor, SD(t) represents the dispersion of the user's gaze direction during time period t, $$\frac{SD(t)}{SD(t) + 1}$$

represents normalization processing, $G_t$ represents the set of scene objects gazed at by the user during the time period t, Ø represents an empty set.

Step 102: Selecting a scene object that meets a preset interest condition from the various scene objects included in the virtual scene as a target perception object, to obtain a target perception object set.

In some embodiments, the executing body may select a scene object that meets a preset interest condition from the various scene objects included in the virtual scene as a target perception object, to obtain a target perception object set. Wherein, the preset interest condition may be that: the user interest of the scene object is the higher among the user interests. The user interests may be the user interests corresponding to various scene objects included in the virtual scene. Firstly, based on the user interests corresponding to the scene objects, the various scene objects included in the virtual scene are sorted in descending order to obtain a scene object sequence. Then, the first preset number of scene objects in the scene object sequence are determined as a target perception object set. Wherein, the preset number may be a number set in advance. For example, the preset number may be 12.

The generation steps and related content of each user interest, as an inventive point of the embodiments of this disclosure, solve the technical problem 2 mentioned in the background technology, which is "difficulty in filtering out in a timely manner the various guide labels that the user is interested in". The reason of this difficulty in filtering out in a timely manner the various guide labels that the user is interested in is often as follows: when the clustering effect is poor, objects of different categories are easily misclassified into one category, and it is also difficult for the selected objects to represent the entire cluster, with the user interest not taken into consideration. If the above problem is solved, the effect of filtering out the various guide labels that the user is interested in in a timely manner can be achieved. To achieve this effect, first, classify the various scene objects in the virtual scene based on whether they are being paid attention to by the gaze of the user, to obtain the various scene objects the user pays attention to and those the user does not pay attention to. Then, for the various scene objects that the user pays attention to, the current interest is mainly determined by the duration of the user's attention. For each scene object that the user does not pay attention to, the current interest is mainly determined by its similarity with the various scene objects that the user pays attention to. Thus, it is convenient to select from the virtual scene the various scene objects that the user is more interested in. Afterwards, through a state transition model, the current interest of the scene object is updated based on the user interest of the scene object in the previous time period. From this, the user interest of the scene object that changes over time may be obtained. Finally, the various target perception objects that the user is most interested in may be selected from various scene objects. Therefore, it is convenient to filter out corresponding guide labels in a timely manner based on the various target perception objects that the user is interested in. Moreover, when determining the similarity between the scene objects the user has not paid attention to and the scene objects the user pays attention to, the contour similarity and background environment similarity between the scene objects are combined, which can improve the accuracy of the similarity between the scene objects and facilitate the improvement of the accuracy of the guided label filtering results.

Step 103: For each target perception object in the target perception object set, performing the following steps:

Step 1031: Based on a pre-constructed perception time mapping function and a user interest corresponding to the target perception object, determining a user perception force corresponding to a target guide label.

In some embodiments, the executing body may, based on a pre-constructed perception time mapping function and a user interest corresponding to the target perception object, determine a user perception force corresponding to a target guide label. Wherein, the target guide label may be a guide label corresponding to the target perception object. The perception time mapping function may characterize a mapping relationship between the guide label and the user perception time. The user perception time may be the duration it takes for the user's gaze point to shift from the target center to the guide label. The user perception force may be a force for moving the guide label to the 3D spatial position with the minimum user perception time.

Alternatively, the above perception time mapping function may be constructed as:

$$PT(x, y, z) = f(V(x, y, z), C(x, y, z), VP(x, y, z)).$$

Wherein, (x, y, z) represents the 3D coordinates in the world coordinate system, PT(x, y, z) represents the user perception time of the guide label located at coordinates (x, y, z), V(x, y, z) represents the visibility of the guide label located at coordinates (x, y, z), C(x, y, z) represents the color contrast between the environment and the guide label located at coordinates (x, y, z), VP(x, y, z) represents the viewport coordinates corresponding to the guide label located at coordinates (x, y, z), and f(•) represents a random forest regressor.

As an example, when in a virtual environment, the Unity engine randomly generates colored guide labels every 1-5 seconds at different positions in 3D space. A user needs to gaze at as many guide labels as possible from a predetermined location. When the gaze falls on these guide labels, the guide labels that the user is gazing at immediately disappear. If a guide label is not gazed at by the user within 10 seconds, the system will remove it. The system records the attributes of the disappearing label and the time interval between its appearance and disappearance. Thus, the following steps may be taken to determine the user's perception time, the visibility value of a guide label, the color contrast between the guide label and the environment, and the viewport coordinates corresponding to the guide label:

The first step is to determine the time interval between the generation of the guide label and the first time the user sees the guide label as the user perception time. Wherein, the user perception time value of the guide label not seen may be 10 seconds.

The second step is to sample the label contour and determine the proportion of accessible sampling points relative to the total sampling points as the visibility value of the guide label.

The third step is, based on the contrast between the guide label and the environment background within a 50×50 pixel area, to determine the color contrast between the guide label and the environment. Firstly, convert the label color and background color from RGB (Red, Green, Blue) format to HSV (Hue, Saturation, Value, color, shade, and brightness) format. Then, calculate the absolute differences in hue, saturation, and brightness between two colors. Finally, the various absolute differences are weighted and summed to obtain the color contrast between the guide label and the environment.

The fourth step is through a viewport transformation matrix to convert the world coordinates where the guide label is located into viewport coordinates.

In certain optional implementations of some embodiments, the executing body may, based on a pre-constructed perception time mapping function and a user interest corresponding to the target perception object, determine a user perception force corresponding to a target guide label through the following steps:

The first step is to determine a perception force direction vector corresponding to a current frame based on the perception time mapping function. Wherein, the current frame may be a video frame corresponding to the current time. The perception force direction vector may characterize the direction of user perception force. The direction of the perception force may be determined by the gradient of the perception time mapping function. It should be noted that since the user perception time mapping function is modeled by a random forest regressor, and the random forest model is implicit, it is fairly difficult to directly calculate the gradient. Therefore, the solution of this disclosure approximates the gradient by fixing the increment along the coordinate axis to determine the change in the user label perception time. The following steps may be executed specifically:

The first sub-step is to determine a reference direction vector for the perception force. Wherein, the reference direction vector may be a direction vector to be corrected. The gradient calculation method for the X-axis, Y-axis, and Z-axis of the reference direction vector is the same. Taking the gradient calculation of the X-axis as an example:

$$\begin{cases} PT_{x+\Delta x} = f(V(x+\Delta x, y, z), C(x+\Delta x, y, z), VP(x+\Delta x, y, z)) \\ PT_x = f(V(x, y, z), C(x, y, z), VP(x, y, z)) \\ PT_{x-\Delta x} = f(V(x-\Delta x, y, z), C(x-\Delta x, y, z), VP(x-\Delta x, y, z)) \end{cases}.$$

Wherein, Δx represents the variation of coordinates (x, y, z) on the X-axis, (x+Δx, y, z) represents the 3D coordinates obtained by moving a distance Δx along the positive direction of the X-axis from the coordinates (x, y, z), (x−Δx, y, z) represents the 3D coordinates obtained by moving a distance Δx along the negative direction of the X-axis from the coordinates (x, y, z), $PT_{x+\Delta x}$ represents the user perception time of the guide label located at coordinates (x+Δx, y, z), $PT_{x-\Delta x}$ represents the user perception time of the guide label located at coordinates (x−Δx, y, z), and $PT_x$ represents the user perception time of the guide label located at coordinates (x, y, z). The positive gradient and negative gradient may be determined by the above formula set:

$$\begin{cases} PT_{x+} = \dfrac{PT_{x+\Delta x} - PT_x}{\Delta x} \\ PT_{x-} = \dfrac{PT_{x-\Delta x} - PT_x}{\Delta x} \end{cases}.$$

Wherein, $PT_{x+}$ represents the positive gradient, and $PT_{x-}$ represents the negative gradient.

The X-axis component of the perception force direction vector may be determined by the following formula:

$$D_x = \begin{cases} -PT_{x+} & PT_{x+} < 0 \text{ and } (PT_{x-} \geq 0 \text{ or } |PT_{x+}| > |PT_{x-}|) \\ PT_{x-} & PT_{x-} < 0 \text{ and } (PT_{x+} \geq 0 \text{ or } |PT_{x-}| > |PT_{x-}|) \\ 0 & \text{others} \end{cases}.$$

Wherein, $D_x$ represents the X-axis component of the perception force direction vector. Similarly, the Y-axis component $D_y$ and the Z-axis component $D_z$ of the perception force direction vector may be determined based on the gradient calculation method mentioned above. From this, the reference direction vector $\vec{D}=(D_x, D_y, D_z)$ of the perception force may be obtained.

The second sub-step is, by a spherical linear interpolation method, and based on the perception force direction vector corresponding to a previous frame and the above reference direction vector, to determine a perception force direction vector corresponding to the current frame. Wherein, the previous frame may be a video frame from the previous moment. The perception force direction vector corresponding to the current frame may be determined by the following formula:

$$\begin{cases} \vec{D}_{Frame} = \dfrac{\sin((1-\alpha)\times\theta)}{\sin\theta} \times \vec{D}_{Frame-1} + \dfrac{\sin(\alpha\times\theta)}{\sin\theta} \times \dfrac{\vec{D}}{\|\vec{D}\|} \\ \theta = \cos^{-1}\left(\vec{D}_{Frame-1} \times \dfrac{\vec{D}}{|\vec{D}|}\right) \\ \alpha = 1 - 0.9 \times \dfrac{\theta}{\pi} \end{cases}.$$

Wherein, Frame represents the current frame, Frame−1 represents the previous frame, $\vec{D}_{Frame}$ represents the perception force direction vector corresponding to the current frame, $\vec{D}_{Frame-1}$ represents the perception force direction vector corresponding to the previous frame, θ represents the angle between $\vec{D}_{Frame-1}$ and $\vec{D}_{Frame}$, and α represents the interpolation coefficient controlled by θ.

In practice, the user perception force usually needs to be calculated in each frame. Due to the possibility of sudden changes in direction between video frames, the label position may be unstable. Therefore, this disclosure uses the spherical linear interpolation method mentioned above to perform temporal smoothing on the direction.

The second step is to generate a user perception force corresponding to the target guide label based on the preset perception force adjustment coefficient, the user interest corresponding to the target perception object, and the perception force direction vector corresponding to the current frame. Wherein, the user perception force corresponding to the target guide label may be generated through the following formula:

$$\vec{F}_{perception}(t) = k_{perception} \times OIS(o, t) \times \vec{D}_{Frame}.$$

Wherein, $\vec{F}_{perception}(t)$ represents the user perception force corresponding to the target guide label during the time period t, and $k_{perception}$ is a predefined adjustable parameter used to adjust the user perception force. For example, $k_{perception}$ may be between 2-10.

Step 1032: Based on the viewport coordinates corresponding to the target guide label, determining a camera force corresponding to the target guide label.

In some embodiments, the executing body may, through various methods, and based on the viewport coordinates corresponding to the target guide label, determine a camera force corresponding to the target guide label. Wherein, the camera force may be a force for keeping the guide label within the user's field of view.

In certain optional implementations of some embodiments, the executing body may determine the camera force corresponding to the target guide label based on the viewport coordinates corresponding to the target guide label through the following steps:

The first step is, based on a preset horizontal axis coordinate boundary distance, vertical axis coordinate boundary distance, first depth coordinate boundary distance, second depth coordinate boundary distance, and the viewport coordinates corresponding to the target guide label, to determine an initial horizontal axis component, initial vertical axis component and initial depth axis component corresponding to the target guide label. Wherein, the horizontal axis coordinate boundary distance may be the boundary distance at which the preset camera force starts to take effect on the X-axis. For example, the range of viewport coordinates on the X-axis is (0,1), and since the guide label actually has size, a transition zone needs to be set for the guide label. When the boundary distance is adjusted to 0.2, the range of camera force on the X-axis will become (0.2, 0.8). The vertical axis coordinate boundary distance may be the boundary distance at which the preset camera force starts to take effect on the Y-axis. The first depth coordinate boundary distance may be the minimum boundary distance at which the preset camera force starts to take effect on the Z-axis. The second depth coordinate boundary distance may be the maximum boundary distance at which the preset camera force starts to take effect on the Z-axis. The initial horizontal axis component may be an initial value of the camera force in the X-axis direction. The initial vertical axis component may be an initial value of the camera force in the Y-axis direction. The initial depth axis component may be an initial value of the camera force in the Z-axis direction. The initial horizontal axis component corresponding to the target guide label may be determined by the following formula:

$$\vec{F}_x = \begin{cases} (m_x - x) \times \vec{i} & x < m_x \\ (x - (1 - m_x)) \times \left(-\vec{i}\right) & x > m_x \\ 0 & \text{others} \end{cases}.$$

Wherein, $\vec{F}_x$ represents the initial horizontal axis component, x represents the position of the target guide label in the X-axis direction of the viewport coordinate system, $m_x$ represents the boundary distance of the horizontal axis coordinate, $\vec{i}$ represents the unit vector in the X-axis direction of the camera coordinate system. The calculation of the initial vertical axis component may refer to the generation steps of the initial horizontal axis component, which will not be repeated here. The initial depth axis component corresponding to the target guide label may be determined by the following formula:

$$\vec{F}_z = \begin{cases} \left(m_{z_{min}} - z\right) \times \vec{k} & x < m_{z_{min}} \\ \left(z - m_{z_{max}}\right) \times \left(-\vec{k}\right) & x > m_{x_{max}} \\ 0 & \text{others} \end{cases}.$$

Wherein, $\vec{F}_z$ represents the initial depth axis component, z represents the position of the target guide label in the Z-axis direction in the viewport coordinate system, $m_{z_{min}}$ represents the first depth coordinate boundary distance, $m_{z_{max}}$ represents the second depth coordinate boundary distance, and $\vec{k}$ represents the unit vector in the Z-axis direction of the camera coordinate system.

The second step is, based on a preset camera force adjustment coefficient, the initial horizontal axis component, the initial vertical axis component and the initial depth axis component, to generate a camera force corresponding to the target guide label. Wherein, the camera force adjustment coefficient may be a parameter used to adjust the camera force. The camera force corresponding to the target guide label may be determined by the following formula:

$$\vec{F}_{camera} = k_{camera} \times \left(\vec{F}_x + \vec{F}_y + \vec{F}_z\right).$$

Wherein, $\vec{F}_{camera}$ represents the camera force corresponding to the target guide label, $k_{camera}$ represents the camera force adjustment coefficient, and $\vec{F}_y$ represents the initial vertical axis component.

Step 1033: Determining the sum of the user perception force and the camera force as a user perceived attraction force corresponding to the target guide label.

In some embodiments, the executing body may determine the sum of the user perception force and the camera force as a user perceived attraction force corresponding to the target guide label.

Step 1034: Based on a dynamic adjustment force corresponding to the target guide label and the user perceived attraction force, generating a label acting force.

In some embodiments, the executing body may, based on a dynamic adjustment force corresponding to the target guide label and the user perceived attraction force, generate a label acting force. Wherein the dynamic adjustment force is a pre-generated force that determines the positional relationship between various guide labels in the virtual scene and between the guide label and the target perception object based on a dynamic potential field. The sum of the dynamic adjustment force and the user perceived attraction force may be determined as a label acting force.

Alternatively, the dynamic adjustment force corresponding to the target guide label may be composed of a label spring force, a region correction force, a label repulsion force, an obstacle repulsion force, a damping force, and a lead crossing force. Wherein, the label spring force may be a force that maintains an appropriate distance between a guide label and a marked scene object according to Hooke's law. When the guide label is rather far away from the marked object, the label spring force pulls the guide label back, otherwise, it bounces the guide label back. The region correction force may be a force that enables the guide label within a certain region to avoid system collapse. The label repulsion force may be a repulsive force that prevents collisions or occlusions between labels. The obstacle repulsion force may be a repulsive force that prevents collisions between the guide label and the objects in the scene. The damping force may be a force inversely proportional to the speed, preventing image shaking and eliminating system crashes caused by rapid acceleration. The lead crossing force may be a force that prevents the leads of various guide labels from overlapping with each other. The sum of the label spring force, the region correction force, the label repulsion force, the obstacle repulsion force, the damping force and the lead crossing force may be determined as a dynamic adjustment force.

Figure 3:
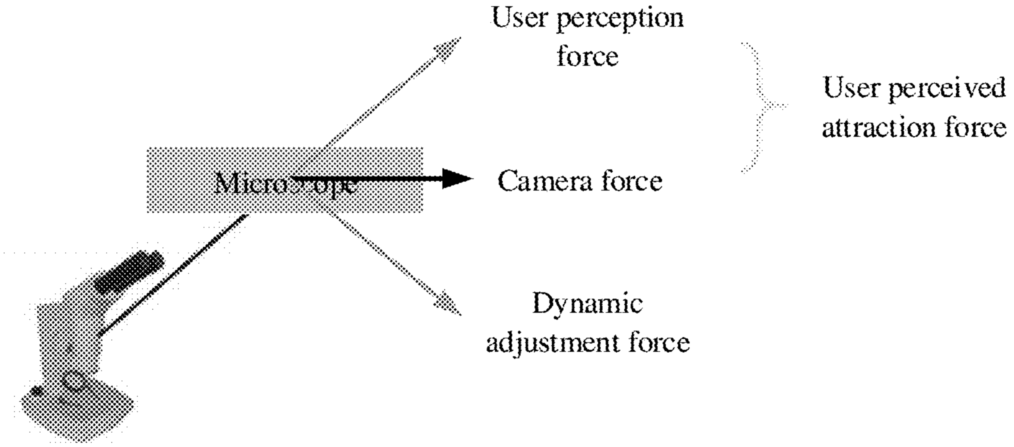
FIG. 3 is a schematic diagram of the force exerted on the guide label corresponding to an example scene object of the label layout method based on user perception for rapid positioning in virtual scenes according to this disclosure.

As an example, FIG. 3 is a schematic diagram of the force exerted on the guide label corresponding to an example scene object of the label layout method based on user perception for rapid positioning in virtual scenes according to this disclosure. Wherein, FIG. 3 includes the forces and directions of forces exerted on the example scene object microscope and the guide label of the example scene object. The user perceived attraction force is composed of the user perception force and camera force. The guide label of the example scene object may be laid out under the action of the user perceived attraction force and the dynamic adjustment force.

Step 104: Based on the various determined label acting forces, updating the positions of various target guide labels corresponding to the target perception object set to obtain a label position update information set for layout of the various target guide labels.

In some embodiments, the executing entity may, based on the various determined label acting forces, update the positions of various target guide labels corresponding to the target perception object set to obtain a label position update information set for layout of the various target guide labels. Wherein, the label position update information in the label position update information set may be the information of the 3D spatial position of the optimized guide label. The following steps may be executed specifically:

The first step is to perform the following steps for each of the various label acting forces:

The first sub-step is, by Newton's second law, to determine the acceleration and velocity of the target guided label based on the label acting force.

The second sub-step is, by kinematic equations, to determine the displacement value of the target guide label based on the acceleration and velocity of the target guide label.

The third sub-step is to determine optimized viewport coordinates based on the displacement values mentioned above and the viewport coordinates corresponding to the target guide label.

The fourth sub-step is to determine the scene object identifier corresponding to the target guide label and the optimized viewport coordinates as the label position update information.

The second step is to update the information set based on the label position and place each target guide label at the corresponding optimized viewport coordinates.

Figure 4:
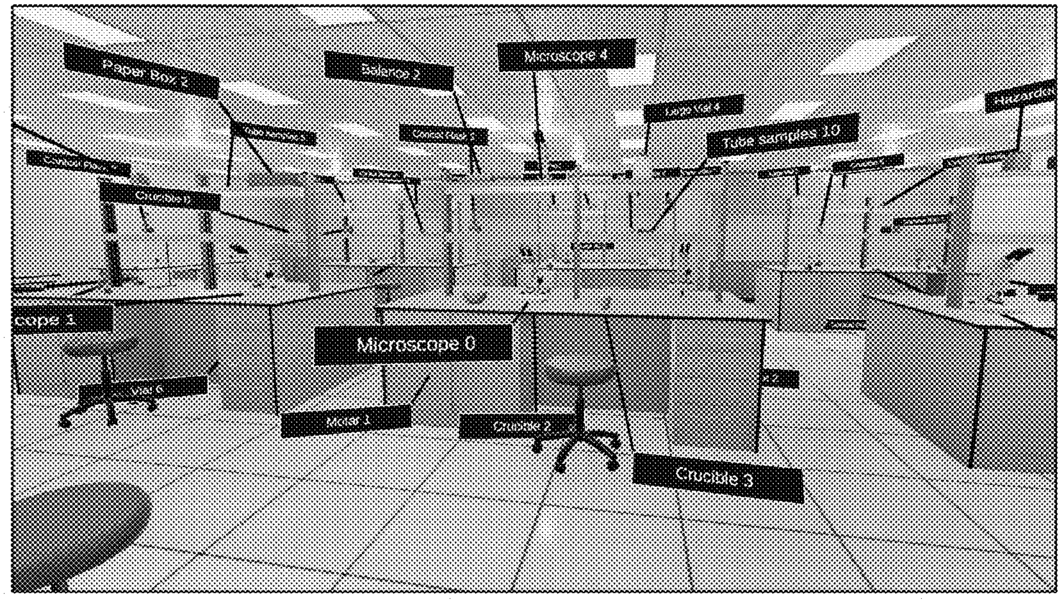
FIG. 4 is an example of the label layout before using the label layout method based on user perception for rapid positioning in virtual scenes of this disclosure.
Figure 5:
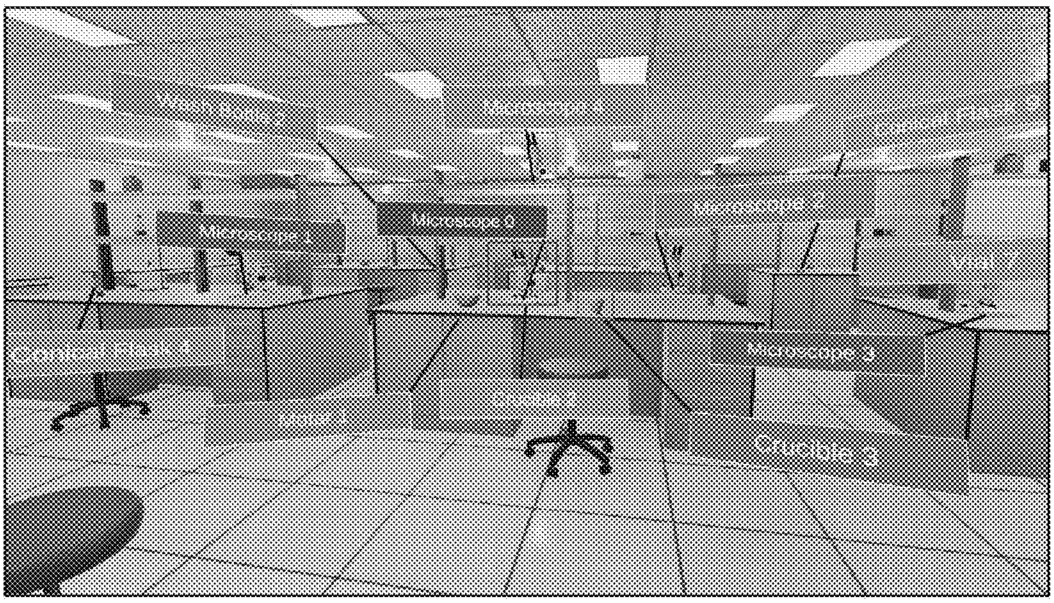
FIG. 5 is an example of the label layout using the label layout method based on user perception for rapid positioning in virtual scenes of this disclosure.

As an example, FIG. 4 is an example of the label layout before using the label layout method based on user perception for rapid positioning in virtual scenes of this disclosure. Wherein, FIG. 4 shows a virtual scene of a scientific laboratory. The virtual scene includes but is not limited to such scene objects as microscopes, crucibles, and so on. FIG. 5 is an example of the label layout using the label layout method based on user perception for rapid positioning in virtual scenes of this disclosure. Wherein, FIG. 5 and FIG. 4 correspond to the same virtual scene. The objects (microscopes) boxed in the middle of FIG. 5 are the target gaze crossing objects intersecting with the user gaze center. There are three dark guide labels shown in FIG. 5, namely Microscope 0, Microscope 1, and Microscope 3. Microscope 0 is the guide label corresponding to the target gaze crossing object (microscope). Microscope 1 and Microscope 3 are the guide labels corresponding to the two scene objects (microscopes) with the highest similarity to the target gaze crossing object in the virtual scene. In addition, compared to FIG. 4, FIG. 5 shows a reduction in the number of guide labels in the virtual scene, and the positions of the same guide labels are optimized. Therefore, it is convenient to shorten the execution time of target search tasks and improve the real-time positioning efficiency of users.

The embodiments of this disclosure have the following beneficial effects: The label layout method based on user perception for rapid positioning in virtual scenes of some embodiments of this disclosure enables a user to perceive various guide labels in a timely manner. Specifically, the reason why the various guide labels are not easily perceived by a user is that: when the layout of various objects in the scene is relatively compact, placing guide labels in the objects' local 3D spatial positions may easily cause occlusion between the guide labels, thereby making it difficult for the user to visually perceive the various guide labels. Based on this, the label layout method based on user perception for rapid positioning in virtual scenes of some embodiments of this disclosure is, firstly, determining a user interest corresponding to each scene object in a virtual scene during a target time period, wherein each scene object corresponds to a guide label, and the attribute information corresponding to the guide label includes viewport coordinates, label visibility, and environmental contrast. From this, the level of interest of the user in various objects in the virtual scene may be determined. Secondly, selecting a scene object that meets a preset interest condition from the various scene objects included in the virtual scene as a target perception object, to obtain a target perception object set. This facilitates the subsequent layout of guide labels for various objects that the user is most interested in. Then, for each target perception object in the target perception object set, performing the following steps: based on a pre-constructed perception time mapping function and a user interest corresponding to the target perception object, determining a user perception force corresponding to a target guide label, wherein the target guide label is a guide label corresponding to the target perception object, the perception time mapping function characterizes a mapping relationship between the guide label and the user perception time, and the user perception force is a force for moving the guide label to the 3D spatial position with the minimum user perception time; based on the viewport coordinates corresponding to the target guide label, determining a camera force corresponding to the target guide label, wherein the camera force is a force for keeping the guide label within the user's field of view; determining the sum of the user perception force and the camera force as a user perceived attraction force corresponding to the target guide label; based on a dynamic adjustment force corresponding to the target guide label and the user perceived attraction force, generating a label acting force, wherein the dynamic adjustment force is a pre-generated force that determines the positional relationship between various guide labels in the virtual scene and between the guide label and the target perception object based on a dynamic potential field. Therefore, for each target perception object that the user is most interested in, the user perceived attraction force may be determined based on the user interest, perception time, and viewport constraints, and combined with dynamic adjustment force, the label acting force for label layout may be obtained finally. In the end, based on the various determined label acting forces, updating the positions of various target guide labels corresponding to the target perception object set to obtain a label position update information set for layout of the various target guide labels. Therefore, based on the label acting force, various guide labels that the user is interested in may be laid out in the 3D spatial position with the minimum user perception time. Therefore, the label layout method based on user perception for rapid positioning in virtual scenes of some embodiments of this disclosure determines the user perceived attraction force based on the user interest of the interested scene object and the user perception time of the guide label, which can facilitate the layout of the guide label in a 3D spatial position that is more easily perceived by the user. Thus, a user can timely perceive various interested guide labels and corresponding scene objects. Moreover, because the guide labels of virtual objects that the user is more interested in may be laid out in positions where the user perception time is shorter, the execution time of target search tasks may be shortened, thereby improving the positioning efficiency of the user in real-time, reducing the user workload, elevating usability, and having lower incidence of motion sickness.

The technical content not elaborated in detail in the present invention belongs to the well-known technology of those skilled in the art.

The method described in some embodiments of the present disclosure may be implemented through software or hardware.

The above description is merely some preferred embodiments of this disclosure and illustrations of the applied technical principles. Those skilled in the art should understand that the scope of the invention involved in the embodiments of this disclosure is not limited to the technical solutions formed by the specific combination of the above technical features, but should cover at the same time, without departing from the above inventive concept, other technical solutions formed by any combination of the above technical features or their equivalent features, for example, a technical solution formed by replacing the above features with technical features of similar functions disclosed in (but not limited to) the embodiments of this disclosure.

The invention claimed is:

1. A label layout method based on user perception for rapid positioning in virtual scenes applied to a label layout device based on user perception for rapid positioning in virtual scenes, the device comprising a memory and a processor configured to execute computer executable instructions to implement the method, the method comprising:

determining a user interest corresponding to each scene object in a virtual scene during a target time period, wherein each scene object corresponds to a guide label, and attribute information corresponding to the guide label includes viewport coordinates, label visibility, and environmental contrast;

selecting a scene object that meets a preset interest condition, from various scene objects included in the virtual scene, as a target perception object, to obtain a target perception object set;

for each target perception object in the target perception object set, performing the following steps:

based on a pre-constructed perception time mapping function and a user interest corresponding to the target perception object, determining a user perception force corresponding to a target guide label, wherein the target guide label is a guide label corresponding to the target perception object, the perception time mapping function characterizes a mapping relationship between the guide label and a user perception time, and the user perception force is a force for moving the guide label to a 3D spatial position with a minimum user perception time;

based on the viewport coordinates corresponding to the target guide label, determining a camera force corresponding to the target guide label, wherein the camera force is a force for keeping the guide label within a user's field of view;

determining a sum of the user perception force and the camera force as a user perceived attraction force corresponding to the target guide label;

based on a dynamic adjustment force corresponding to the target guide label and the user perceived attraction force, generating a label acting force, wherein the dynamic adjustment force is a pre-generated force that determines a positional relationship between various guide labels in the virtual scene and between the guide label and the target perception object based on a dynamic potential field;

based on various determined label acting forces, updating positions of various target guide labels corresponding to the target perception object set, to obtain a label position update information set for layout of the various target guide labels.

2. The method of claim 1, wherein, the determining a user interest corresponding to each scene object in a virtual scene during a target time period includes:

classifying various scene objects in the virtual scene, to obtain a target gaze crossing object set and a non-target gaze crossing object set, wherein, each target gaze crossing object is an object that is being gazed at by the user during the target time period, and each target gaze crossing object corresponds to a user gaze duration;

for each target gaze crossing object in the target gaze crossing object set, determining a ratio of the user gaze duration corresponding to the target gaze crossing object to a preset duration as a current interest of the target gaze crossing object, wherein, the preset duration isa duration of the target time period;

for each non-target gaze crossing object in the non-target gaze crossing object set, performing the following steps:

performing similarity analysis on the non-target gaze crossing object and each target gaze crossing object in the target gaze crossing object set to obtain an object similarity information set;

determining a current interest corresponding to the non-target gaze crossing object based on various current interests corresponding to the target gaze crossing object set and the object similarity information set;

based on an object historical interest information set, updating the current interest of each scene object in the virtual scene to generate the user interest, wherein, each object historical interest information in the object historical interest information set corresponds to the scene object in the virtual scene, and each object historical interest information is information on the user interest of the corresponding scene object in the virtual scene during previous time period.

3. The method of claim 2, wherein, the performing similarity analysis on the non-target gaze crossing object and each target gaze crossing object in the target gaze crossing object set to obtain an object similarity information set includes:

for each target gaze crossing object in the target gaze crossing object set, performing the following steps:

determining a contour similarity and an environment similarity between the target gaze crossing object and the non-target gaze crossing object;

generating object similarity information based on the contour similarity and the environment similarity, wherein, the object similarity information is generated using the following formula:

$$\Phi(o_1, o_2) = \frac{\phi_c(o_1, o_2)^2 + \sqrt{\phi_e(o_1, o_2)}}{2}$$

wherein, $o_1$ represents the non-target gaze crossing object, $o_2$ represents the target gaze crossing object, $\Phi(o_1, o_2)$ represents the object similarity information, $\phi_c(o_1, o_2)$ represents the contour similarity, and $\phi_e(o_1, o_2)$ represents the environment similarity.

4. The method of claim 1, wherein, the perception time mapping function is:

$$PT(x, y, z) = f(V(x, y, z), C(x, y, z), VP(x, y, z)),$$

wherein, (x, y, z) represents 3D coordinates in a world coordinate system, PT(x, y, z) represents the user perception time of the guide label located at coordinates (x, y, z), V(x, y, z) represents the visibility of the guide label located at coordinates (x, y, z), C(x, y, z) represents a color contrast between environment and the guide label located at coordinates (x, y, z), VP(x, y, z) represents the viewport coordinates corresponding to coordinates (x, y, z), and f(•) represents a random forest regressor.

5. The method of claim 4, wherein, the based on a pre-constructed perception time mapping function and a user interest corresponding to the target perception object, determining a user perception force corresponding to a target guide label, includes:

determining a perception force direction vector corresponding to a current frame based on the perception time mapping function;

generating the user perception force corresponding to the target guide label based on a preset perception force adjustment coefficient, the user interest corresponding to the target perception object, and the perception force direction vector corresponding to the current frame.

6. The method of claim 5, wherein, the based on the viewport coordinates corresponding to the target guide label, determining a camera force corresponding to the target guide label, includes:

based on a preset horizontal axis coordinate boundary distance, vertical axis coordinate boundary distance, first depth coordinate boundary distance, second depth coordinate boundary distance, and the viewport coordinates corresponding to the target guide label, determining an initial horizontal axis component, initial vertical axis component and initial depth axis component corresponding to the target guide label;

based on a preset camera force adjustment coefficient, the initial horizontal axis component, the initial vertical axis component and the initial depth axis component, generating the camera force corresponding to the target guide label.

7. The method of claim 6, wherein, the dynamic adjustment force corresponding to the target guide label is composed of a label spring force, a region correction force, a label repulsion force, an obstacle repulsion force, a damping force, and a lead crossing force.

8. The method of claim 2, wherein, the perception time mapping function is:

$$PT(x, y, z) = f(V(x, y, z), C(x, y, z), VP(x, y, z)),$$

wherein, (x, y, z) represents 3D coordinates in a world coordinate system, PT(x, y, z) represents the user perception time of the guide label located at coordinates (x, y, z), V(x, y, z) represents the visibility of the guide label located at coordinates (x, y, z), C(x, y, z) represents a color contrast between environment and the guide label located at coordinates (x, y, z), VP(x, y, z) represents the viewport coordinates corresponding to coordinates (x, y, z), and f(•) represents a random forest regressor.

9. The method of claim 8, wherein, the based on a pre-constructed perception time mapping function and a user interest corresponding to the target perception object, determining a user perception force corresponding to a target guide label, includes:

determining a perception force direction vector corresponding to a current frame based on the perception time mapping function;

generating the user perception force corresponding to the target guide label based on a preset perception force adjustment coefficient, the user interest corresponding to the target perception object, and the perception force direction vector corresponding to the current frame.

10. The method of claim 9, wherein, the based on the viewport coordinates corresponding to the target guide label, determining a camera force corresponding to the target guide label, includes:

based on a preset horizontal axis coordinate boundary distance, vertical axis coordinate boundary distance, first depth coordinate boundary distance, second depth coordinate boundary distance, and the viewport coordinates corresponding to the target guide label, determining an initial horizontal axis component, initial vertical axis component and initial depth axis component corresponding to the target guide label;

based on a preset camera force adjustment coefficient, the initial horizontal axis component, the initial vertical axis component and the initial depth axis component, generating the camera force corresponding to the target guide label.

11. The method of claim 10, wherein, the dynamic adjustment force corresponding to the target guide label is composed of a label spring force, a region correction force, a label repulsion force, an obstacle repulsion force, a damping force, and a lead crossing force.

12. The method of claim 3, wherein, the perception time mapping function is:

$$PT(x, y, z) = f(V(x, y, z), C(x, y, z), VP(x, y, z)),$$

wherein, (x, y, z) represents 3D coordinates in a world coordinate system, PT(x, y, z) represents the user perception time of the guide label located at coordinates (x, y, z), V(x, y, z) represents the visibility of the guide label located at coordinates (x, y, z), C(x, y, z) represents a color contrast between environment and the guide label located at coordinates (x, y, z), VP(x, y, z) represents the viewport coordinates corresponding to coordinates (x, y, z), and f(•) represents a random forest regressor.

13. The method of claim 12, wherein, the based on a pre-constructed perception time mapping function and a user interest corresponding to the target perception object, determining a user perception force corresponding to a target guide label, includes:

determining a perception force direction vector corresponding to a current frame based on the perception time mapping function;

generating the user perception force corresponding to the target guide label based on a preset perception force adjustment coefficient, the user interest corresponding to the target perception object, and the perception force direction vector corresponding to the current frame.

14. The method of claim 13, wherein, the based on the viewport coordinates corresponding to the target guide label, determining a camera force corresponding to the target guide label, includes:

based on a preset horizontal axis coordinate boundary distance, vertical axis coordinate boundary distance, first depth coordinate boundary distance, second depth coordinate boundary distance, and the viewport coordinates corresponding to the target guide label, determining an initial horizontal axis component, initial vertical axis component and initial depth axis component corresponding to the target guide label;

based on a preset camera force adjustment coefficient, the initial horizontal axis component, the initial vertical axis component and the initial depth axis component, generating the camera force corresponding to the target guide label.

15. The method of claim 14, wherein, the dynamic adjustment force corresponding to the target guide label is composed of a label spring force, a region correction force, a label repulsion force, an obstacle repulsion force, a damping force, and a lead crossing force.

* * * * *